J. E. JOHNSON.
TOOTH BAND.
APPLICATION FILED MAR. 1, 1918.
1,304,881.
Patented May 27, 1919.
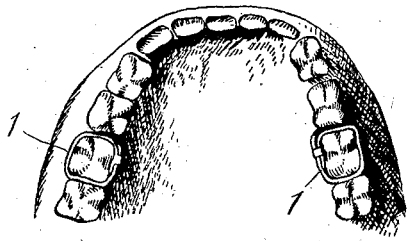
Fig. 1.
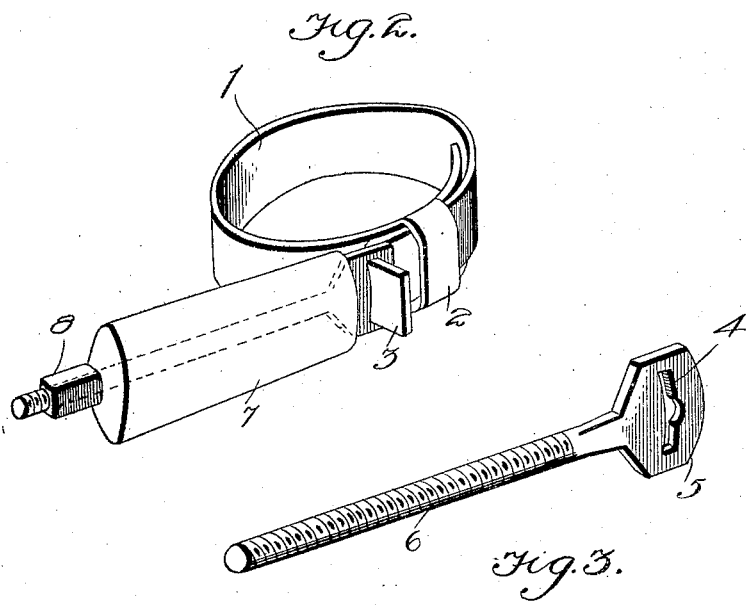
Fig. 2.
Fig. 3.
WITNESSES
George C. Myers
INVENTOR
JOSEPH E. JOHNSON
BY
ATTORNEYS

UNITED STATES PATENT OFFICE.

JOSEPH EBERT JOHNSON, OF LOUISVILLE, KENTUCKY.

TOOTH-BAND.

1,304,881.  Specification of Letters Patent.  Patented May 27, 1919.

Application filed March 1, 1918. Serial No. 219,831.

*To all whom it may concern:*

Be it known that I, JOSEPH E. JOHNSON, a citizen of the United States, and a resident of Louisville, in the county of Jefferson and State of Kentucky, have invented certain new and useful Improvements in Tooth-Bands, of which the following is a specification.

My invention is an improvement in tooth bands, and has for its object to provide means for fitting on teeth bands of the character used for holding straightening devices and the like on teeth, wherein the band will have a smooth surface on the lingual side that will not irritate the tongue.

In the drawings:

Figure 1 is a plan view showing the band in place;

Fig. 2 is a perspective view of the band and the means for fitting the same; and Fig. 3 is a perspective view of the screw.

In the present embodiment of the invention, means is provided for fitting the bands upon the teeth, the bands after being fitted being removed and soldered to be afterward replaced.

The bands 1, which are of suitable strip metal, are provided near one end with a loop or keeper 2, through which the other end of the strip may be passed, as shown in Fig. 2. This last named end of the strip is provided with an outwardly bent lug 3, which is adapted to be passed through a transverse slot 4 in the head 5 of a screw 6.

This screw is passed through a sleeve 7, and a nut 8 engages the screw at the opposite end of the sleeve from the lug 3.

In fitting the bands, they are placed about the tooth in the manner shown in Fig. 1, the head of the screw 6 being connected with the lug 3. Holding the sleeve 7, the nut 8 is turned until the band is properly fitted upon the tooth. After the band has been properly adjusted, the screw, together with the sleeve 7, is removed, and the band is soldered with the ends overlapped. This gives a well fitting band with a smooth surface on the lingual side, and any desired device may be connected with the band to support the said device.

I claim:

1. A device for fitting bands to teeth comprising in combination a band formed from a strip of suitable metal having at one end a loop or keeper through which the other end is passed, said end having an outwardly bent lug, a screw having a head provided with a transverse slot for receiving the lug, a sleeve through which the screw passes, and a nut threaded on to the screw at the opposite end of the sleeve from the band.

2. A band of the character specified comprising a strip of suitable metal having near one end a keeper through which the other end is adapted to pass, said other end having an outwardly bent lug to prevent its disengagement from the keeper and to serve as an anchor for engagement by tightening means.

JOSEPH EBERT JOHNSON.

Witnesses:
 MARY LIBBY,
 LOUISA WINKLER.

Copies of this patent may be obtained for five cents each, by addressing the "Commissioner of Patents, Washington, D. C."